(12) United States Patent
David et al.

(10) Patent No.: US 11,612,989 B2
(45) Date of Patent: *Mar. 28, 2023

(54) DEVICE, SYSTEM AND METHOD FOR MEASURING ANGLE ADJUSTMENT OF A HOOKSPANNER WRENCH TO ACCURATELY TIGHTEN A BEARING ONTO A SHAFT HAVING AN ADAPTER SLEEVE

(71) Applicant: Aktiebolaget SKF

(72) Inventors: Sebastien David, LP Ouderkerk a/d Amstel (NL); Arjan van Os, RA Alphen a/d Rijn (NL)

(73) Assignee: Aktiebolaget SKF, Gothenburg (SE)

( * ) Notice: Subject to any disclaimer, the term of this patent is extended or adjusted under 35 U.S.C. 154(b) by 699 days.

This patent is subject to a terminal disclaimer.

(21) Appl. No.: 16/691,374

(22) Filed: Nov. 21, 2019

(65) Prior Publication Data

US 2021/0154804 A1    May 27, 2021

(51) Int. Cl.
*G01C 9/06* (2006.01)
*G01C 1/00* (2006.01)
*B25B 13/48* (2006.01)
*F16C 35/063* (2006.01)

(52) U.S. Cl.
CPC .......... *B25B 13/48* (2013.01); *F16C 35/063* (2013.01); *G01C 1/00* (2013.01); *G01C 9/06* (2013.01)

(58) Field of Classification Search
CPC ..... B25B 13/48; B25B 13/5033; B25B 27/06; F16C 35/063; F16C 25/06; F16C 2226/60; F16C 2229/00; F16C 2300/02; F16C 19/522; F16C 35/073; G01C 1/00; G01C 9/06

See application file for complete search history.

(56) References Cited

U.S. PATENT DOCUMENTS

| | | | |
|---|---|---|---|
| 9,506,746 B2 | 11/2016 | Holzl | |
| 9,841,274 B2 | 12/2017 | Holzl | |
| 10,107,331 B1* | 10/2018 | Rode | F16C 19/364 |
| 10,792,795 B2* | 10/2020 | Lee | B25G 1/102 |
| 11,279,006 B2* | 3/2022 | David | B25B 13/48 |
| 2018/0163770 A1* | 6/2018 | Rode | B25B 13/50 |
| 2018/0243887 A1 | 8/2018 | Hohmann et al. | |
| 2018/0310956 A1 | 11/2018 | Polster | |
| 2018/0333831 A1* | 11/2018 | Lee | B25G 1/102 |
| 2019/0001473 A1 | 1/2019 | Harper | |
| 2019/0308483 A1 | 10/2019 | Cox | |
| 2020/0240782 A1 | 7/2020 | Mocini et al. | |

(Continued)

*Primary Examiner* — Yaritza Guadalupe-McCall
(74) *Attorney, Agent, or Firm* — Garcia-Zamor Intellectual Property Law, LLC; Ruy Garcia-Zamor

(57) ABSTRACT

A system for measuring angle adjustment of a hookspanner wrench to accurately tighten a bearing onto a shaft, the shaft having an adapter sleeve mounted thereon, the adapter sleeve having a threaded and tapered portion. The system including a device providing a hookspanner wrench having a lever arm and an engaging portion, the engaging portion of the hookspanner wrench configured to engage a bearing locking nut, the lever arm configured to mount a storage clamping device fixed thereto, a smartphone secured in place by the storage clamping device, and a specialized application stored on the smartphone that provides a built-in inclinometer and look up data tables.

10 Claims, 13 Drawing Sheets

(56) References Cited

U.S. PATENT DOCUMENTS

| | | | | |
|---|---|---|---|---|
| 2020/0400525 A1* | 12/2020 | King | ...................... | B25G 1/102 |
| 2021/0154803 A1* | 5/2021 | David | ..................... | B25B 23/14 |
| 2021/0154804 A1* | 5/2021 | David | ..................... | B25B 13/48 |
| 2022/0214240 A1* | 7/2022 | King | ................... | B25B 23/1425 |

\* cited by examiner

DEVICE, SYSTEM AND METHOD FOR MEASURING ANGLE ADJUSTMENT OF A HOOKSPANNER WRENCH TO ACCURATELY TIGHTEN A BEARING ONTO A SHAFT HAVING AN ADAPTER SLEEVE

TECHNOLOGICAL FIELD

The present invention relates to the field of measuring angle movement of a hookspanner wrench. The invention relates more particularly to the field of measuring angle adjustment of a hookspanner wrench to accurately tighten a bearing onto a shaft having an adapter sleeve utilizing an application on a smartphone mounted to the hookspanner wrench.

BACKGROUND OF THE INVENTION

The current technology for accomplishing the function of the present invention provides making an inaccurate manual angle marking on the hookspanner wrench and by making another inaccurate manual reference mark on the application/shaft. Then, turning the hookspanner wrench to until the two manually referenced marks blindly match up.

SUMMARY OF THE INVENTION

According to a first aspect, an exemplary embodiment relates to a device for measuring angle adjustment of a hookspanner wrench to accurately tighten a bearing onto a shaft, the shaft having an adapter sleeve mounted thereon. The device provides a hookspanner wrench having a lever arm and an engaging portion, the engaging portion configured to engage a bearing locking nut, the lever arm configured to mount a storage clamping device fixed thereto, a smartphone secured in place by the storage clamping device, and a specialized application or executable program stored on the smartphone that provides a built-in inclinometer and look up data tables.

In a second aspect of the above exemplary embodiment the look up data tables display a correct bearing locking nut drive up angle based on a bearing type inputted into the smartphone.

In a third aspect of the above exemplary embodiment when a force is applied to an outer end of the lever arm and the hookspanner wrench begins to rotate the bearing locking nut, and in response the inclinometer responds in real time and displays an updated locking nut drive up angle position.

In a further aspect of the above exemplary embodiment the application of force applied to the lever arm is stopped when the correct mounting angle/drive up position is indicated as being obtained on the inclinometer.

In a further aspect of the above exemplary embodiment the storage clamping device provides an adjustment mechanism that enables installation of the smartphone in both a horizontal and vertical direction to facilitate different sized smartphones.

In a further aspect of the above exemplary embodiment one of an angle, a number, and a color is displayed on the inclinometer to indicate the mounting angle/drive up position obtained.

In a further aspect of the above exemplary embodiment a Full Qwerty Keypad is provided for entering bearing type information that identifies a correct locking nut drive up angle on at least one display of the computing device.

According to a second aspect, exemplary embodiments relate to a system for measuring angle adjustment of a hookspanner wrench to accurately tighten a bearing onto a shaft, the shaft having an adapter sleeve. The system includes a device providing a hookspanner wrench having a lever arm and an engaging portion, the engaging portion configured to engage a bearing locking nut, the lever arm configured to mount a storage clamping device fixed thereto, a smartphone secured in place by the storage clamping device, and a specialized application stored on the smartphone that provides a built-in inclinometer and look up data tables, the bearing having an inner race and a tapered bore being mounted over an outer unthreaded portion of the tapered shaft, the bearing locking nut having a threaded inner portion and is screwed onto a threaded portion of the tapered portion of the adapter sleeve, the bearing locking nut screwed onto the threaded portion of the tapered portion of the adapter sleeve until an inner side of the locking nut and an outer side of the bearing inner race contact each other, an interlocking arrangement providing a meshing grip between the hookspanner wrench and the locking nut, information regarding a type of bearing to be secured being entered into the smartphone, and in response, a correct mounting angle/drive up position of the locking nut is displayed on the built-in inclinometer, a force F applied to the lever portion of the hookspanner wrench causes the hookspanner wrench to rotate while the mounting angle/drive up position is monitored against what is displayed on the inclinometer and the application of force to the lever portion is stopped when the correct mounting angle/drive up position is indicated as being obtained on the inclinometer.

In a further aspect of the above exemplary embodiment the contact between an inner side of the locking nut and an outer side of the bearing inner race is a metal to metal contact.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
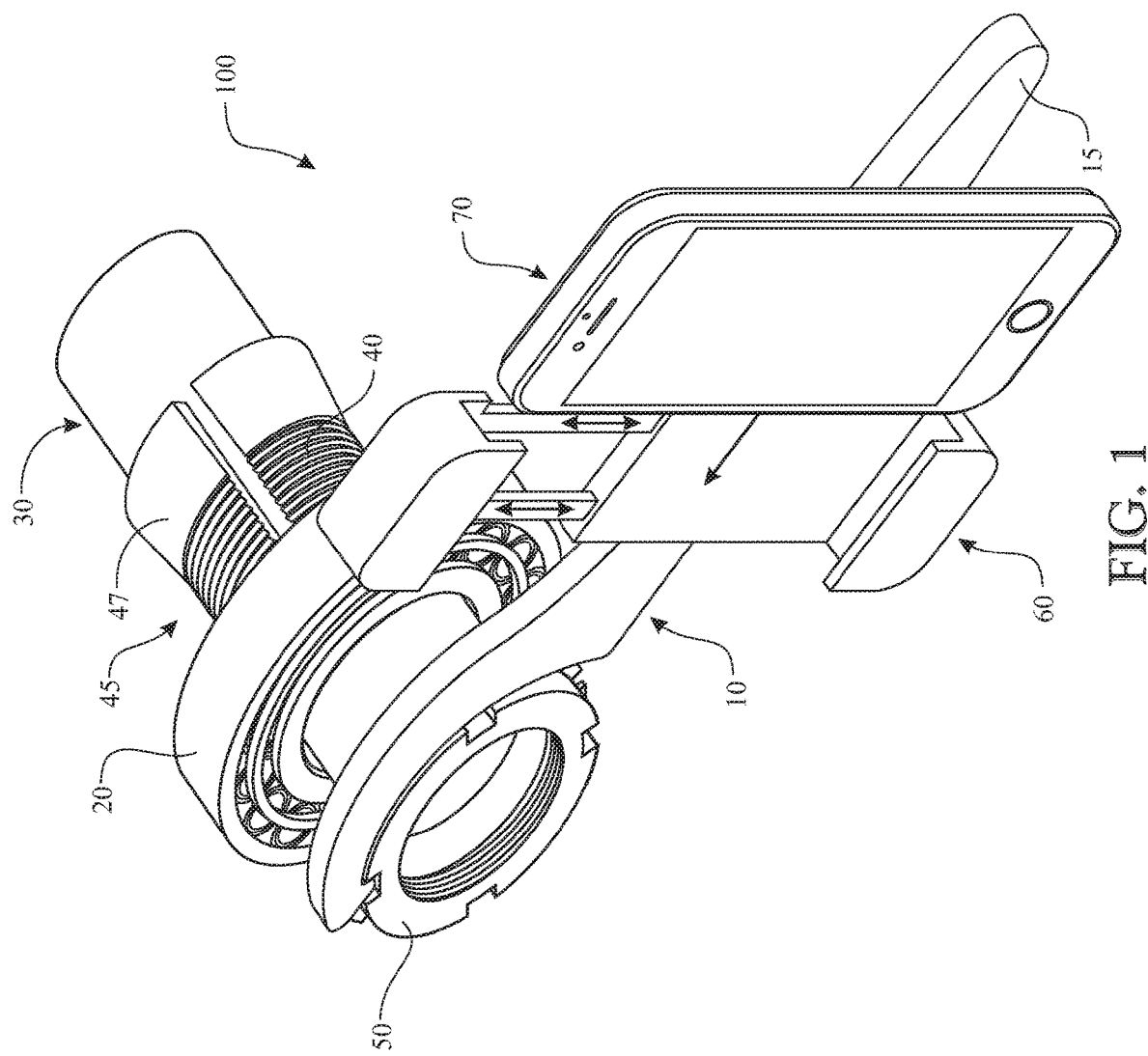
FIG. 1 is an elevated perspective view of a system for measuring angle adjustment of a hookspanner wrench according to an embodiment of the present invention.

For purposes of description herein, the terms "inward," "outward," "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

System and Device

There is shown in FIG. 1 a system 100 for measuring angle adjustment of a hookspanner wrench 10 to accurately tighten a bearing 20 onto a shaft 30 having an adapter sleeve 45. The adapter sleeve 45 is disposed over an outer surface of the shaft 30. The adapter sleeve 45 provides a threaded portion 40 and a tapered portion 47. The threaded portion 40 includes a slot 49, the purpose of which will be disclosed later in this description. The system 100 further provides a locking nut 50 that is to be tightened by the hookspanner wrench 10.

Figure 2:
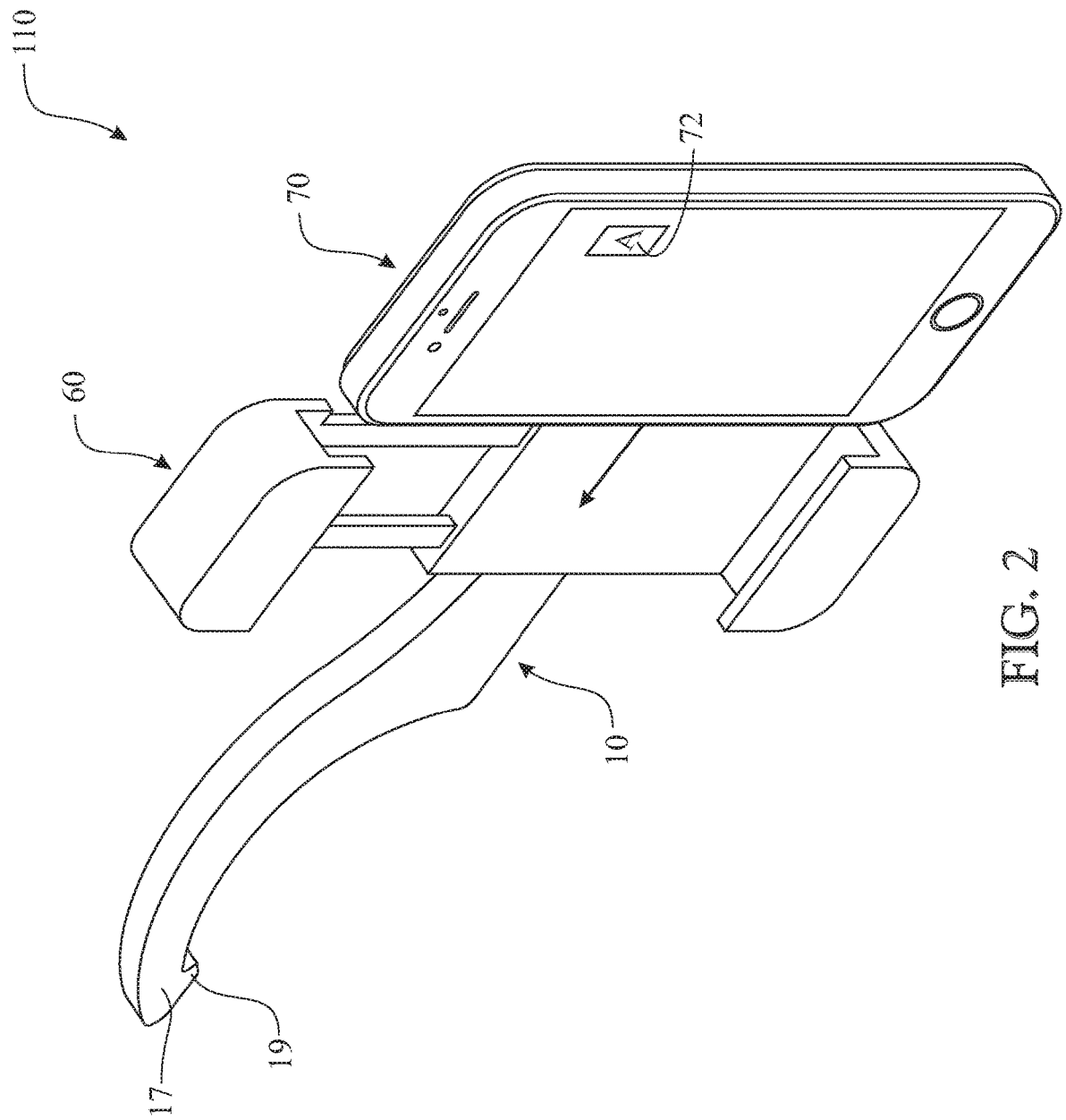
FIG. 2 is an elevated perspective view of a device according to the system of FIG. 1.

Now referring to FIGS. 1-2, the system 100 may also provide a device 110. The device 110 by itself, is illustrated in FIG. 2. The device 110 provides the hookspanner wrench 10, which includes a lever arm 15 and an engaging portion 17. The engaging portion 17 of the hookspanner wrench 10 is configured to engage at least four indentations 52 disposed on an outer surface of the bearing locking nut 50. The engaging portion 17 includes a projection 19 that interlocks with one of the at least four indentations 52. As such, this interlocking arrangement provides a latching grip between the hookspanner wrench 10 and the locking nut 50.

The lever arm 15 is configured to mount a storage clamping device 60 fixed thereto. A portable communications device or smartphone 70 is secured in place by the storage clamping device 60. The storage clamping device 60 provides a sliding adjustment mechanism. The sliding adjustment mechanism enables installation of the smartphone in both a horizontal and vertical direction (as depicted by the arrows) to facilitate different sized smartphones.

An Application (App) 72 or Mobile application software 72 that is designed to run on smartphones and other mobile devices is stored in a memory 930 (See FIG. 11) of the smartphone 70. The smartphone may also provide a microprocessor 932 that works together with the memory 930 in order carry out the functions of the App. Most importantly to the present invention, the App 72 provides a built-in inclinometer 90 and look up data tables 74 that are shown on a display 77 (See FIGS. 14A, 14B and 14C). The look up data tables 74 display a correct bearing to locking nut drive up angle based on a bearing type that is inputted into the smartphone.

Figure 3:
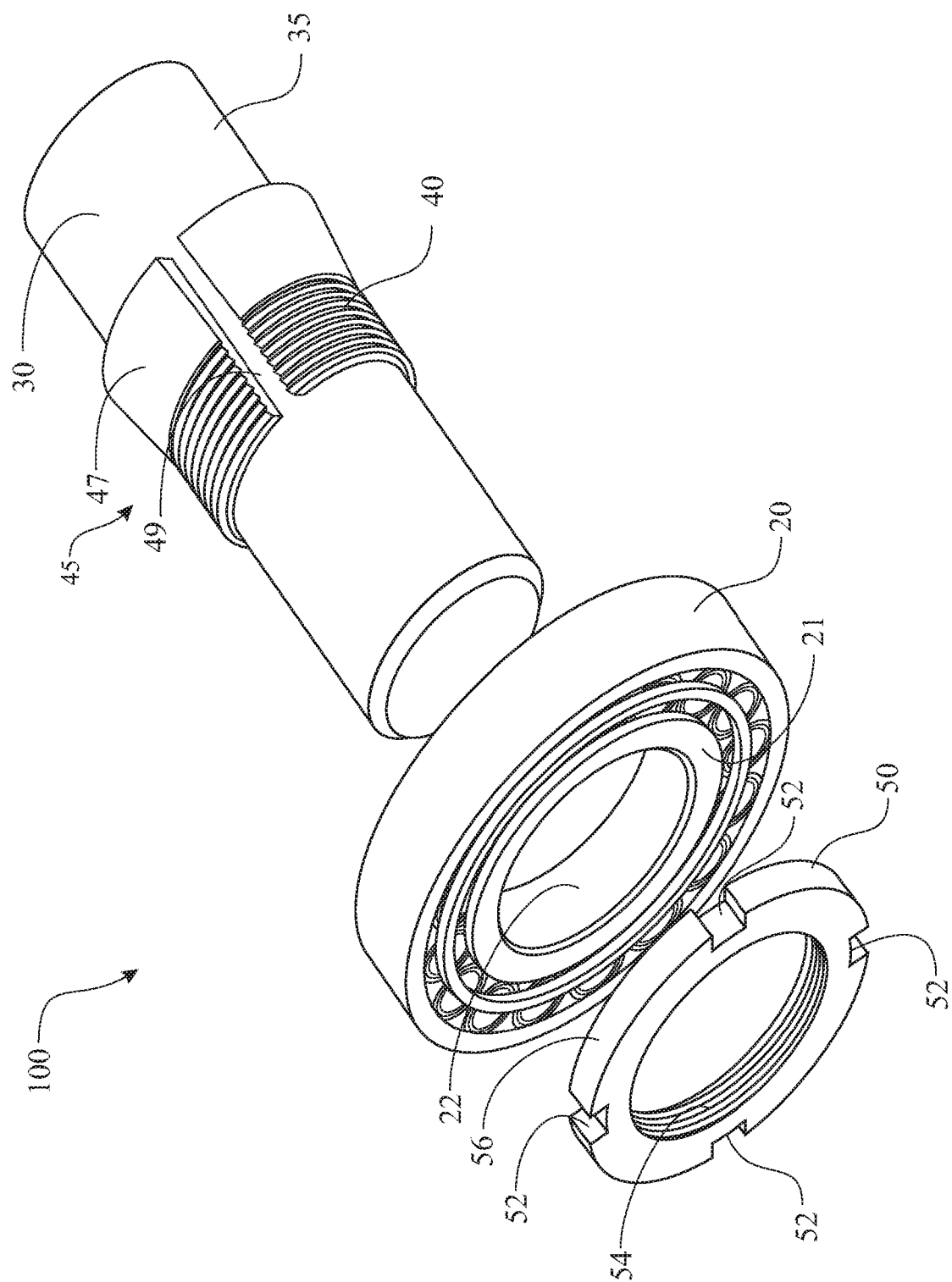
FIG. 3 is an elevated perspective view of a locking nut, bearing, shaft and adapter sleeve according to the system of FIG. 1.
Figure 4:
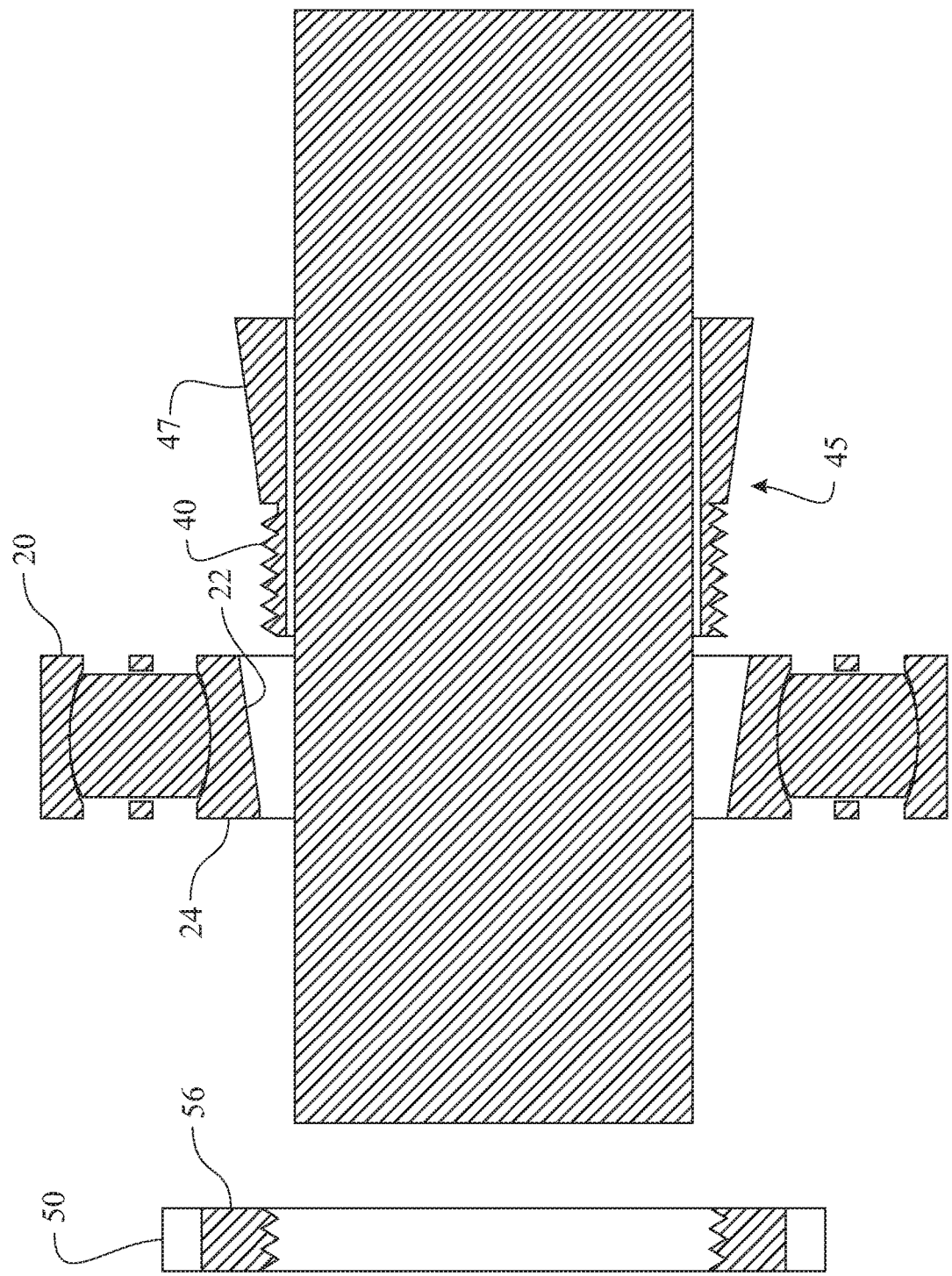
FIG. 4 is a cross-sectional view of the locking nut, shaft, adapter sleeve and bearing according to the system of FIG. 1.
Figure 5:
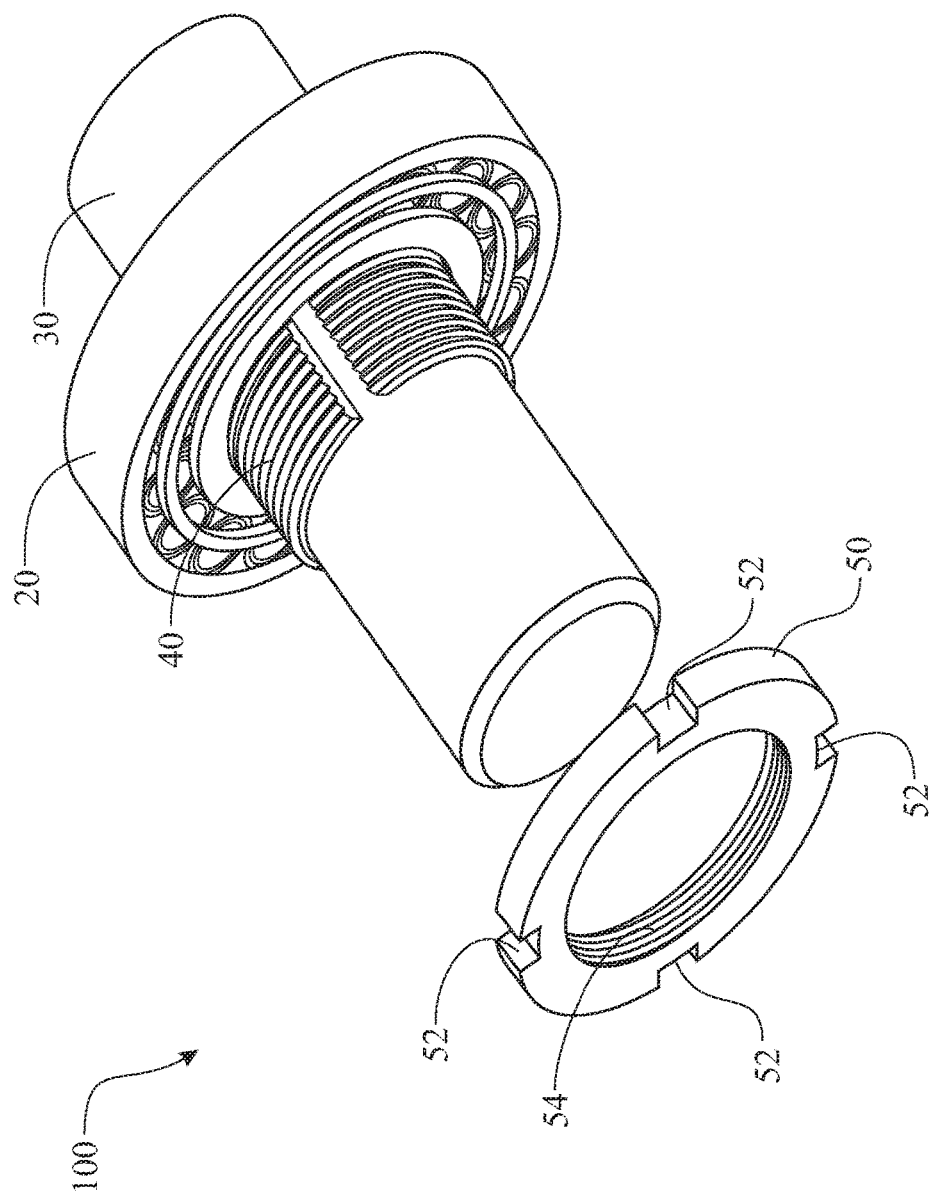
FIG. 5 is an elevated perspective view of a system that includes a device, locking nut, mounting shaft, adapter sleeve and bearing shown disposed on a tapered portion of the shaft according to the system of FIG. 1.

Referring now to FIGS. 3-5, the bearing 20 has an inner race 21 that includes a tapered bore 22. During assembly, the tapered bore 22 of the bearing 20 is gently slid up over the threaded portion 40 of the adapter sleeve 45 and rests on the tapered portion 47 of the adapter sleeve 45. The bearing locking nut 50 has a threaded inner portion 54. The threaded inner portion 54 of the locking nut 50 mates with the threaded portion 40 of the adapter sleeve 45.

The bearing locking nut 50 is screwed onto the threaded portion 40 of the shaft 30 until an inner side 56 of the locking nut 50 and an outer side of the bearing inner race 24 contact each other. The locking nut 50 is "hand tightened" until the inner side 56 of the locking nut 56 and outer side of the bearing inner race just begin to make contact and only a very light force is created driving up against the bearing. In addition, depending on the materials of construction, the contact between the inner side 56 of the locking nut 50 and the outer side of the bearing inner race 24 may provide a metal to metal contact.

Figure 6:
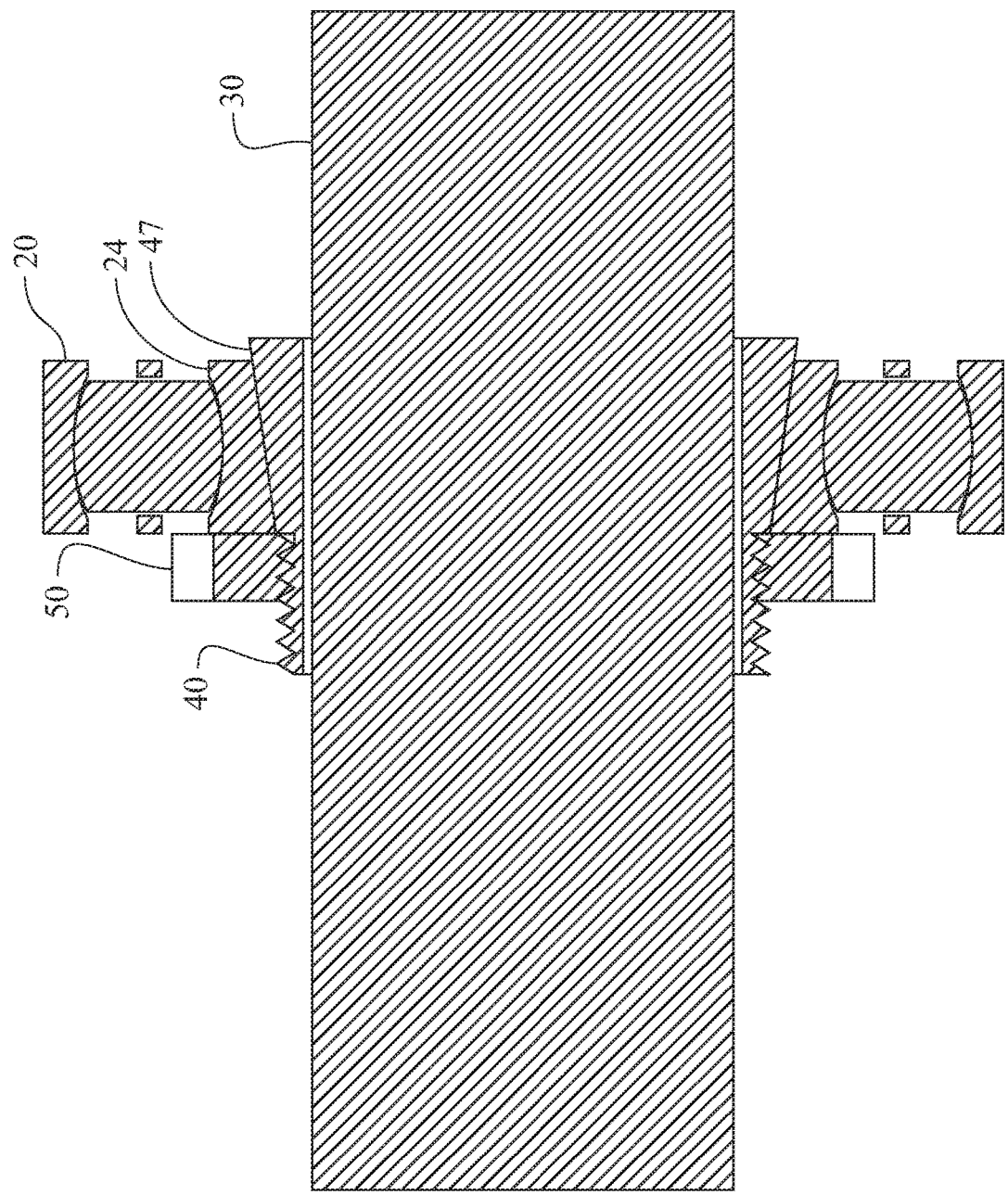
FIG. 6 is a cross-sectional view of the locking nut and bearing being installed onto the adapter sleeve according to the embodiment of FIG. 1.
Figure 7:
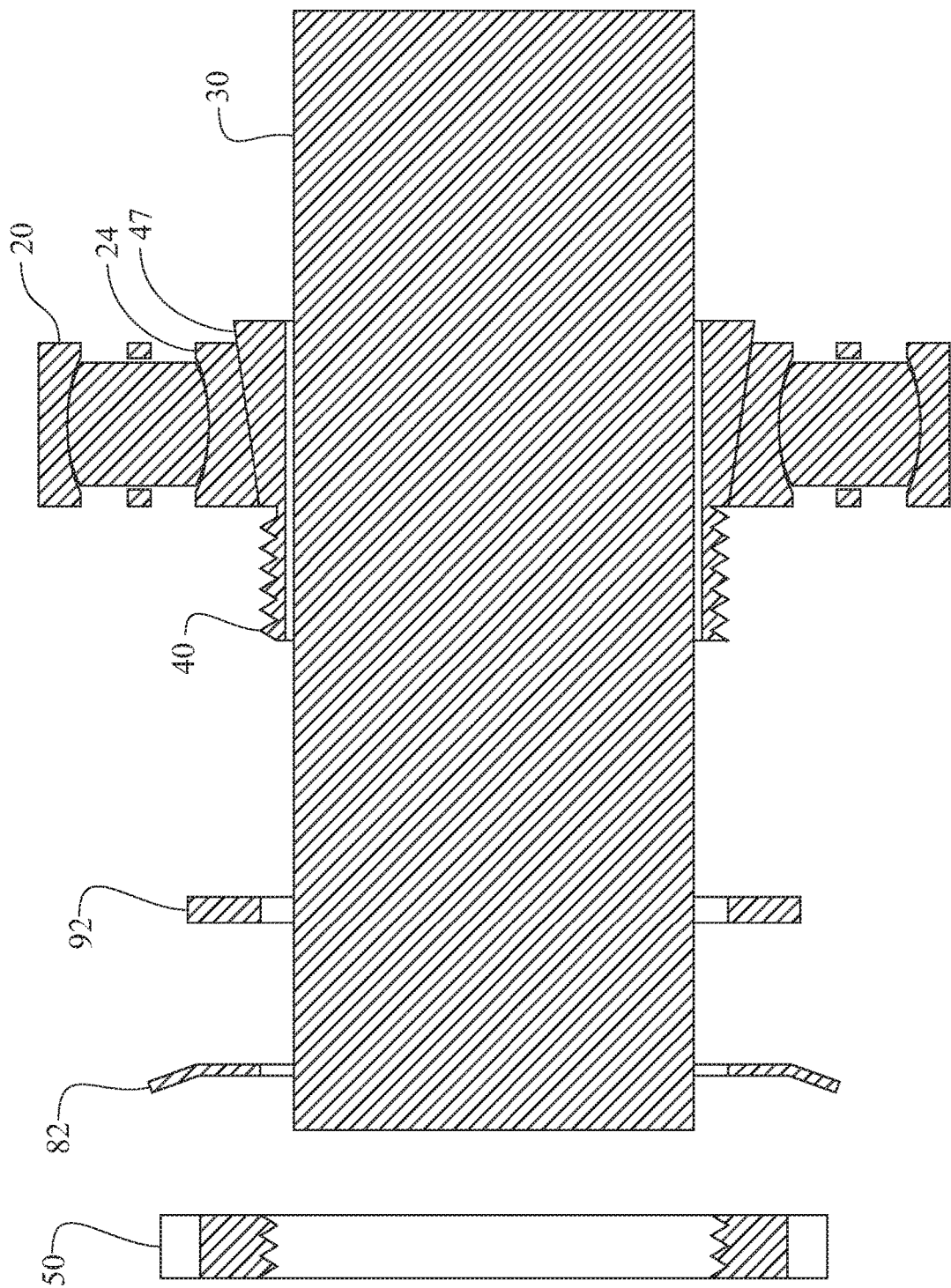
FIG. 7 is a cross-sectional view of the locking nut, lock washer, spacer, adapter sleeve and bearing being installed onto the shaft according to an embodiment of the invention.
Figure 8:
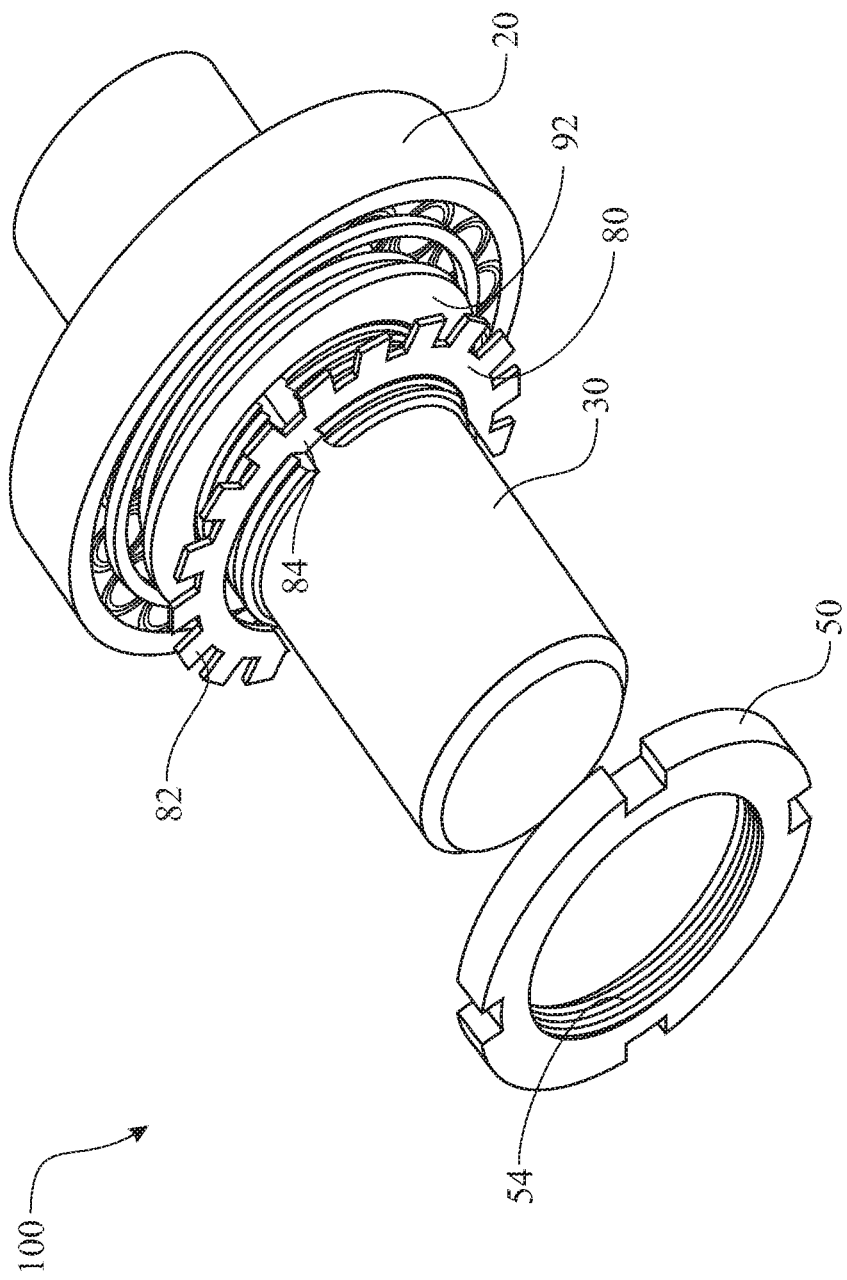
FIG. 8 is an elevated perspective view of the locking nut, lock washer, spacer, adapter sleeve and bearing being installed onto the shaft according to an embodiment of the invention.
Figure 9:
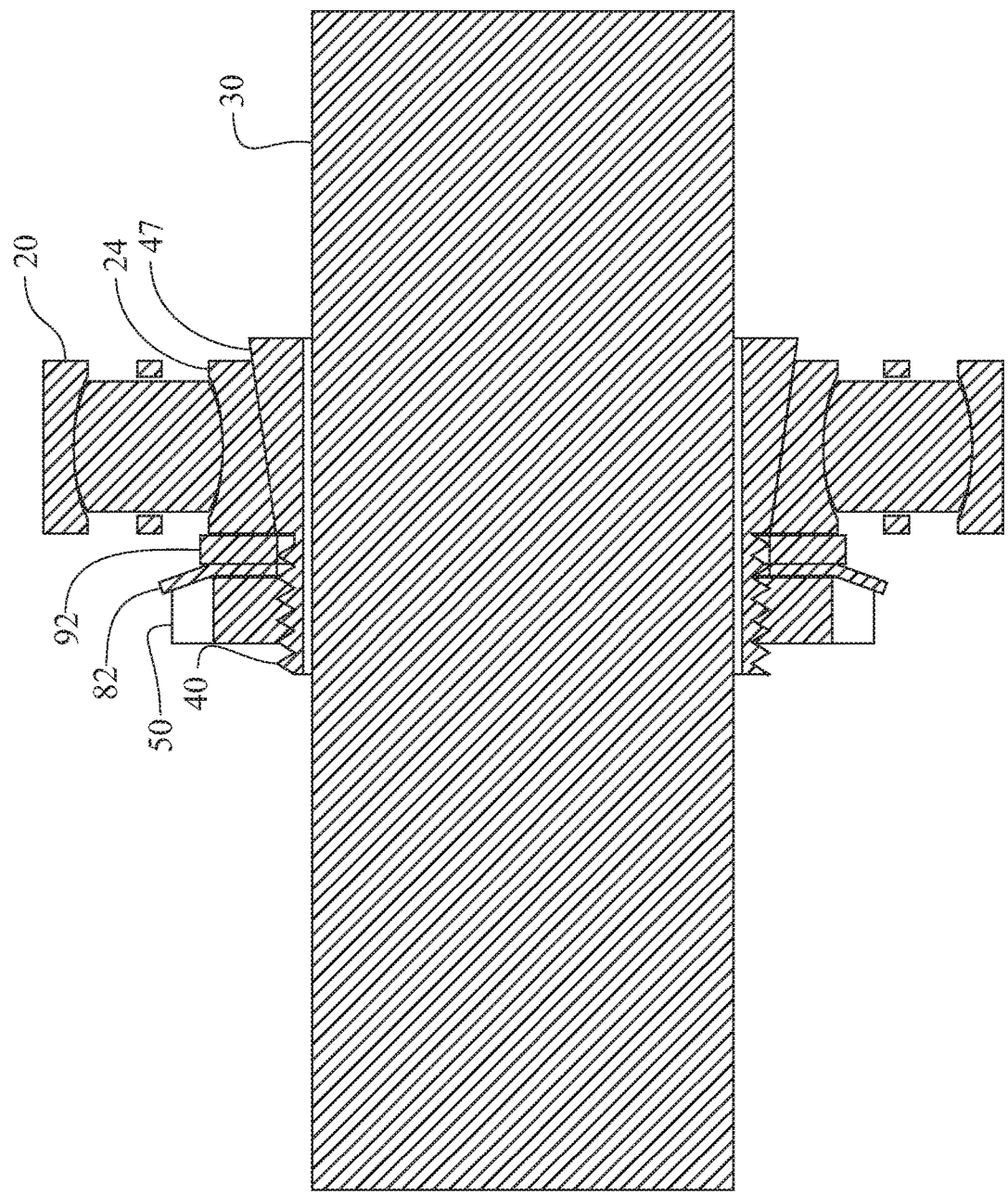
FIG. 9 is a cross-sectional view of the locking nut, lock washer, spacer, adapter sleeve and bearing installed onto the shaft according to an embodiment of the invention.

Once the inner side 56 of the locking nut 50 is hand tightened up against the outer side of bearing inner race 24 the location of the bearing 20 on the tapered portion 47 of the adapter sleeve 45 is initially set. The assembly of which can be seen in the cross-section illustrated in FIG. 6.

At this point, the locking nut 50 is now removed so that a spacer 92 and a lock washer 82 can be inserted onto the adapter sleeve and over the shaft and are gently pressed up against the inner race 24 of the bearing 20. See FIGS. 6-9. A tab 84 of the lock washer 82 that projects radially inward engages the recessed slot 49 of the threaded portion 40 of the adapter sleeve 45. This engagement prevents the lock washer from spinning and functions to secure the locking nut to the lock washer when tightened. Now that the spacer and lock washer are installed, the locking nut is manually screwed onto the threaded portion of the adapter sleeve 45. Once again, the locking nut 50 is "hand tightened" until the inner side 56 of the locking nut 56 and outer side of the bearing inner race just begin to make contact and only a very light force between the two is created driving up against the bearing.

Figure 10:
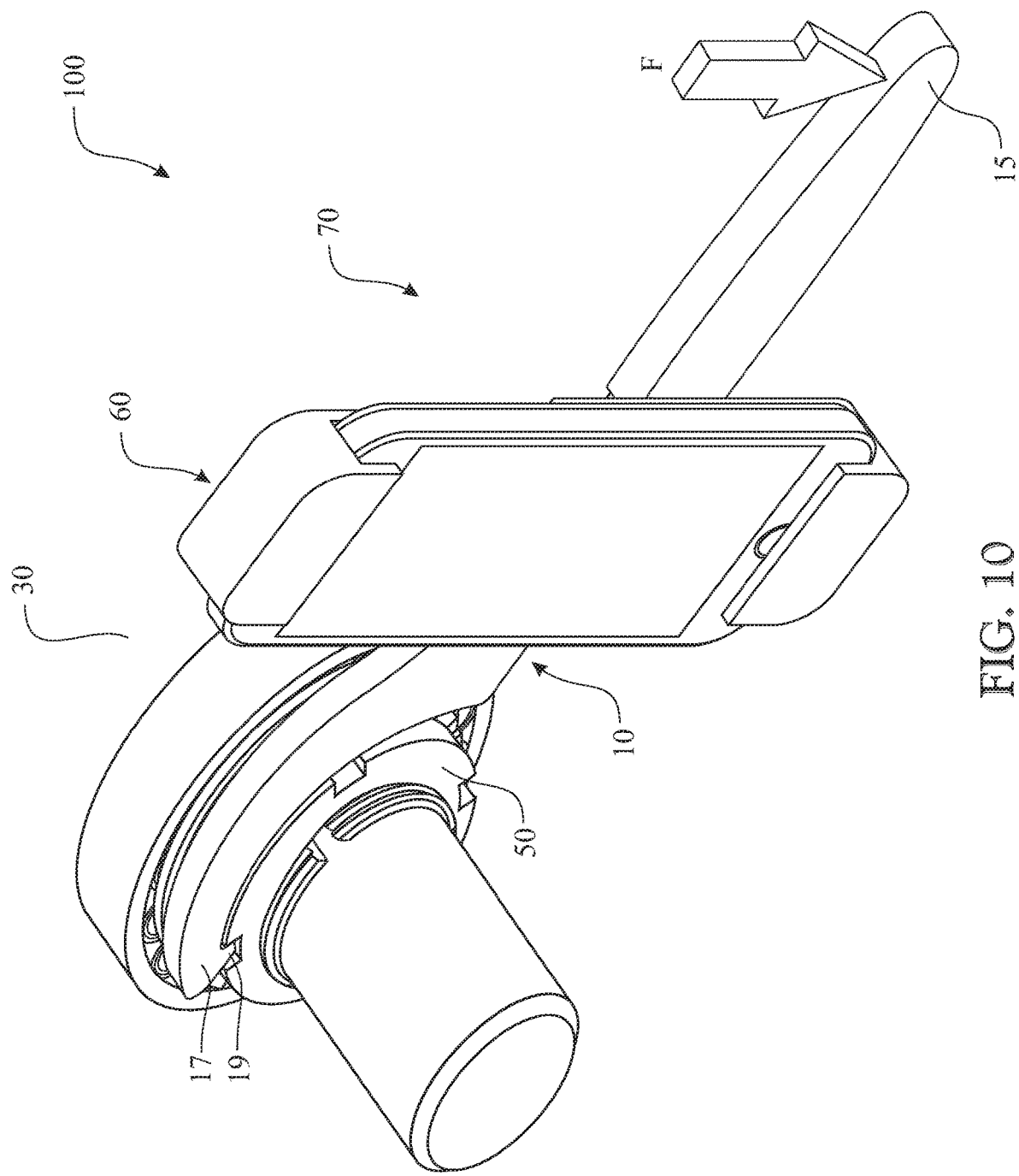
FIG. 10 is an elevated perspective view of the system for measuring angle adjustment of a hookspanner wrench with the bearing, spacer, lock washer and locking nut in the process of being secured onto the adapter sleeve according to an embodiment of the present invention.

Now that the bearing with the tapered inner race is initially set onto the tapered portion of the adapter sleeve and the spacer, lock washer and locking nut are hand tightened in place, the device 110 for accurately securing the bearing onto the shaft as shown in FIG. 10 is ready to be utilized.

Now referring to FIGS. 10-13, there is shown a Full Qwerty Keypad FQK for entering bearing type information. The bearing type information identifies a correct locking nut drive up angle 90 based on the bearing type inputted. The correct locking nut drive up angle 90 is shown on the display 77 of the computing device 70. See specifically FIGS. 11A, 11B and 11C. The look up data tables 74 display a correct bearing to locking nut drive up angle based on a bearing type that is inputted into the smartphone. In response, a correct mounting angle/drive up position of the locking nut 50 is displayed on the built-in inclinometer 90.

When a force F is applied to the lever portion 15 of the hookspanner wrench, the force causes the hookspanner wrench to rotate. When the force F is applied the hookspanner wrench begins to rotate the bearing locking nut. As the wrench begins to rotate, the inclinometer responds in real time and displays an updated locking nut drive up angle position in a clockwise fashion. Accordingly, while rotating the mounting angle/drive up position is monitored against what is displayed on the inclinometer 90. The application of force F to the lever portion is stopped when the correct mounting angle/drive up position is indicated as being obtained on the inclinometer.

The correct mounting angle/drive up position can be indicated in multiple ways. First, a graph of the drive up angle can be displayed as illustrated in FIG. 11B. Here, an initial Start point is indicated and as the spanner wrench is rotated, the Current angle α changes. The drive up angle is reached when the arrow indicates the Goal is reached.

Figure 11C:
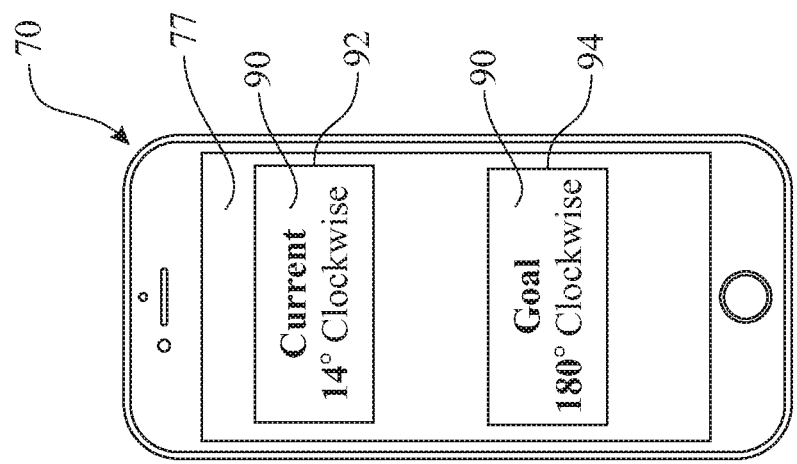
FIGS. 11A, 11B and 11C are plan views of the various options for displaying the inclinometer application on a portable computing device according to an embodiment of the present invention.
Figure 11B:
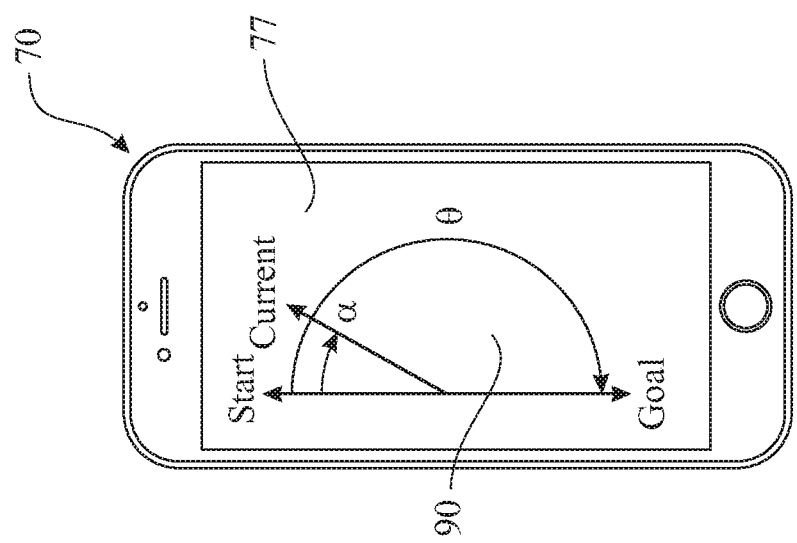
Figure 11A:
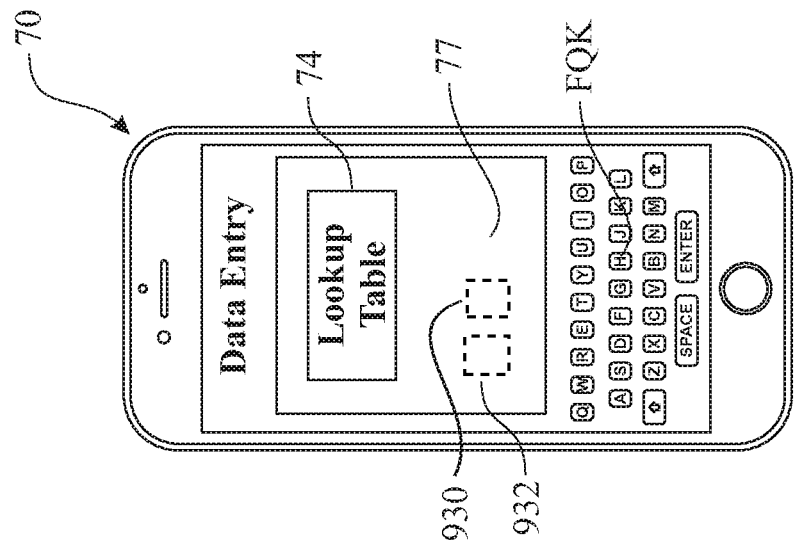

In the configuration shown in FIG. 11C, the Start or Current angle may be displayed in an upper portion 92 of the inclinometer 90 and the Goal angle may be displayed in a lower portion 94 of the inclinometer 90.

Figure 12:
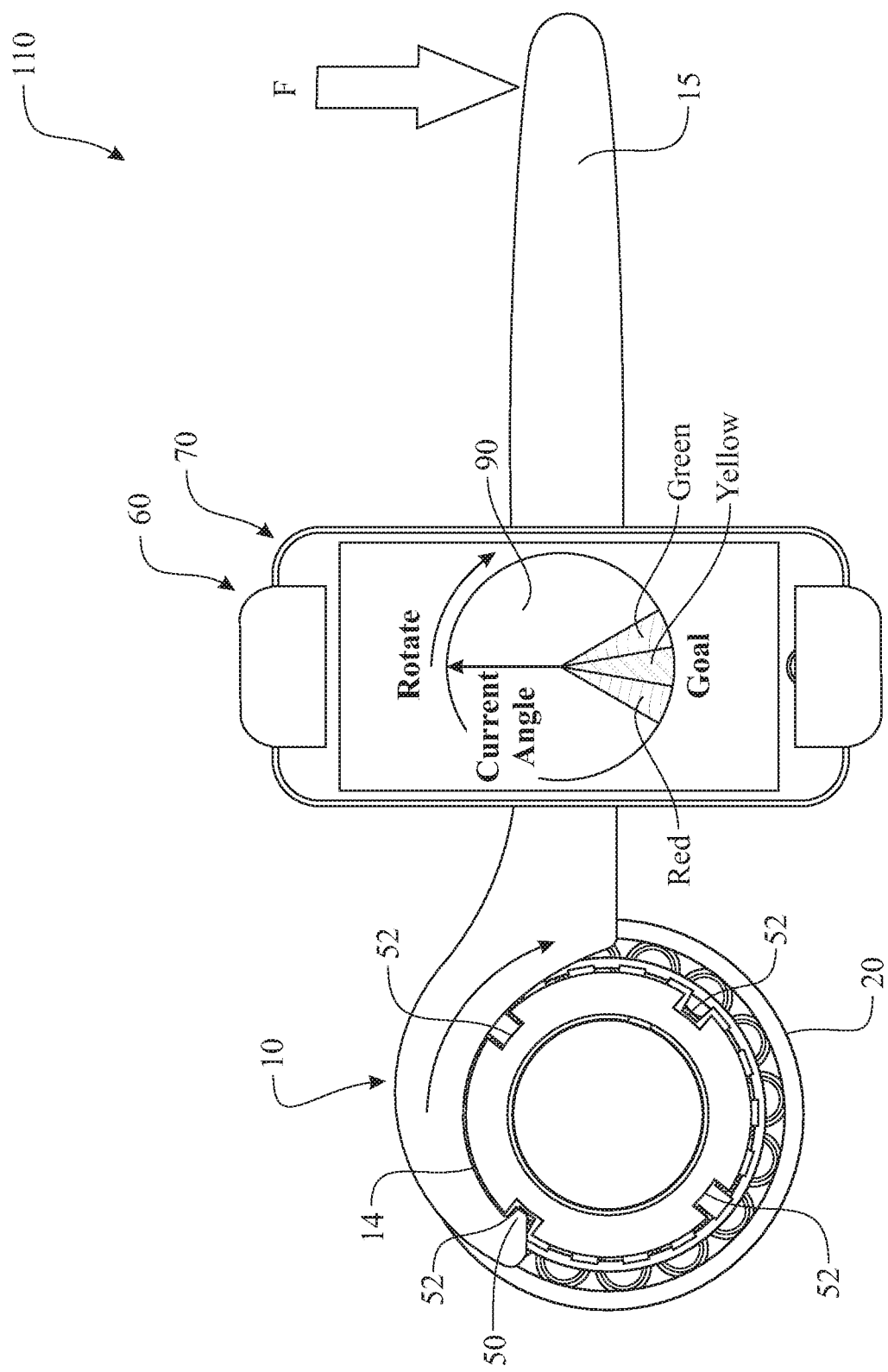
FIG. 12 is a side plan view of the system for measuring angle adjustment of a hookspanner wrench showing the inclinometer application running in real time on the portable computing device according to an embodiment of the present invention.
Figure 13:
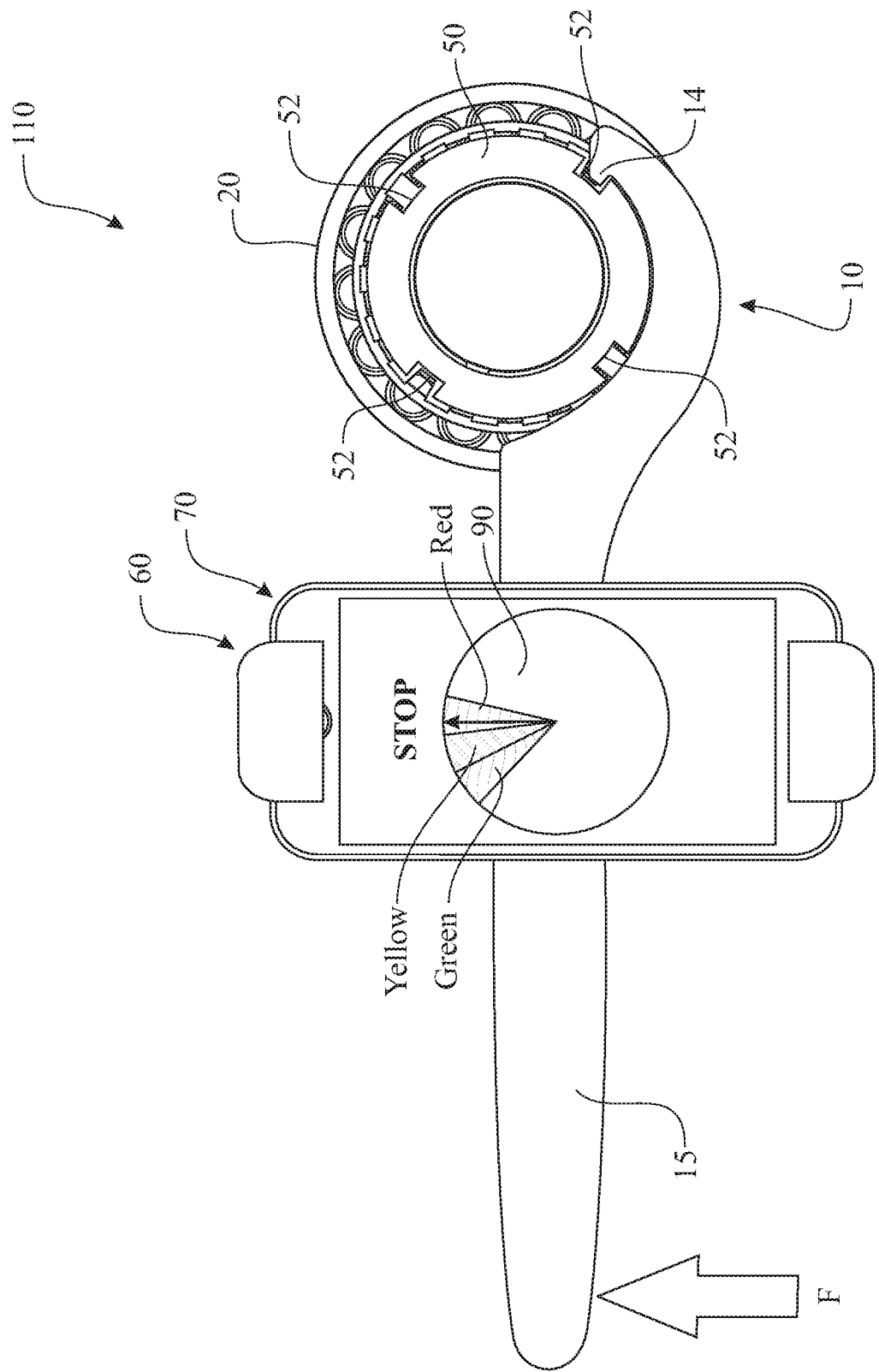
FIG. 13 is a further side plan view of the system for measuring angle adjustment of a hookspanner wrench showing the inclinometer application running in real time and showing that a stop position has been reached according to an embodiment of the present invention.

In the configuration shown in FIGS. 12-13, the Start or Current angle may be displayed as a vertical arrow extending upwards on the display of the inclinometer. Here, a color is displayed on the inclinometer 90 to indicate the present mounting angle/drive up position. For example, the section on the inclinometer that is colored Green may indicate "continue rotating the hookspanner wrench". The Yellow section may indicate "you are getting close to the desired drive up angle Goal" and the Red section may indicate the Goal has been obtained". As such, the vertical arrow stays extending upwards and the sections of color move towards the Goal as the spanner wrench is rotated.

Since many modifications, variations, and changes in detail can be made to the described preferred embodiments and methods of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A device for measuring angle adjustment of a hookspanner wrench to accurately tighten a bearing onto a shaft having an adapter sleeve, the device comprising:
    a hookspanner wrench having a lever arm and an engaging portion, the engaging portion configured to engage a bearing locking nut, the lever arm configured to mount a storage clamping device fixed thereto,
    a smartphone secured in place by the storage clamping device, and
    a specialized application stored on the smartphone that provides a built-in inclinometer and look up data tables, the built-in inclinometer displaying:
        a first color when the hookspanner wrench is in a first position;
        a second color when the hookspanner wrench in between the first position and a second position; and
        a third color when the hookspanner wrench is in the second position.

2. The device for measuring angle adjustment of a hookspanner wrench according to claim 1, wherein the look up data tables display a correct bearing locking nut drive up angle based on a bearing type inputted into the smartphone.

3. The device for measuring angle adjustment of a hookspanner wrench according to claim 2, wherein when a force is applied to an outer end of the lever arm and the hookspanner wrench begins to rotate the bearing locking nut, and wherein the inclinometer responds in real time and displays an updated locknut drive up angle position.

4. The device for measuring angle adjustment of a hookspanner wrench according to claim 3, wherein the application of force applied to the lever arm is stopped when the correct mounting angle/drive up position is indicated as being obtained on the inclinometer.

5. The device for measuring angle adjustment of a hookspanner wrench according to claim 1, wherein the storage clamping device provides an adjustment mechanism that enables installation of the smartphone in both a horizontal and vertical direction to facilitate different sized smartphones.

6. The device for measuring angle adjustment of a hookspanner wrench according to claim 1, wherein one of an angle, a number, and a color is displayed on the inclinometer to indicate the mounting angle/drive up position obtained.

7. The device for measuring angle adjustment of a hookspanner wrench according to claim 1, further comprises a Full Qwerty Keypad for entering bearing type information that identifies a correct locking nut drive up angle on at least one display of the computing device.

8. A device for measuring angle adjustment of a hookspanner wrench to accurately tighten a bearing onto a shaft having an adapter sleeve, the device comprising:
    a hookspanner wrench having a lever arm and an engaging portion, the engaging portion configured to engage a bearing locking nut, the lever arm configured to mount a storage clamping device fixed thereto,
    a smartphone secured in place by the storage clamping device, and
    a specialized application stored on the smartphone that provides a built-in inclinometer and look up data tables, wherein a specialized application stored on the smartphone that provides the built-in inclinometer and look up data tables provides a traffic light concept to indicate the mounting angle/drive up position obtained by displaying a green light for continuing to tighten the hookspanner wrench, a yellow lamp for when getting close to the pre-programmed angle, and a red lamp for stopping at the pre-programmed angle.

9. A system for measuring angle adjustment of a hookspanner wrench to accurately tighten a bearing onto a shaft having an adapter sleeve mounted thereon, the adapter sleeve having a threaded portion and a tapered portion, the system comprising:

a device providing a hookspanner wrench having a lever arm and an engaging portion, the engaging portion of the hookspanner wrench configured to engage a bearing locking nut, the lever arm configured to mount a storage clamping device fixed thereto, a smartphone secured in place by the storage clamping device, and a specialized application stored on the smartphone that provides a built-in inclinometer and look up data tables, the built-in inclinometer displaying:
  a first color when the hookspanner wrench is in a first position;
  a second color when the hookspanner wrench in between the first position and a second position; and
  a third color when the hookspanner wrench is in the second position,
the bearing having an inner race, the inner race having a tapered bore, the bearing being slid onto a tapered portion of the adapter sleeve,
the bearing locking nut having a threaded inner portion and screwed onto a threaded portion of the adapter sleeve, the bearing locking nut being screwed onto the threaded portion of the adapter sleeve until an inner side of the locking nut and an outer side of the bearing inner race just start to contact each other,
an interlocking arrangement providing a meshing grip between the hookspanner wrench and the locking nut,
information regarding a type of bearing to be secured being entered into the smartphone, and wherein
in response, a correct mounting angle/drive up position of the locking nut is displayed on the built-in inclinometer,
a force F applied to the lever portion of the hookspanner wrench causes the hookspanner wrench to rotate while the mounting angle/drive up position is monitored against what is displayed on the inclinometer and wherein
the application of force to the lever portion is stopped when the correct mounting angle/drive up position is indicated as being obtained on the inclinometer.

10. The system for measuring angle adjustment of a hookspanner wrench to accurately secure a bearing onto a shaft having an adapter sleeve mounted thereon according to claim 9, wherein the contact between an inner side of the locking nut and an outer side of the bearing inner race is a metal to metal contact.

* * * * *